Feb. 11, 1958

L. N. FRENCH 2,823,349

ELECTRICAL WELL LOGGING

Filed Aug. 10, 1953

INVENTOR.
L. N. FRENCH

BY *Hudson & Young*

ATTORNEYS

Feb. 11, 1958     L. N. FRENCH     2,823,349
ELECTRICAL WELL LOGGING

Filed Aug. 10, 1953     2 Sheets-Sheet 2

INVENTOR.
L. N. FRENCH

BY *Hudson & Young*

ATTORNEYS

United States Patent Office 2,823,349
Patented Feb. 11, 1958

2,823,349

ELECTRICAL WELL LOGGING

Louis N. French, Bartlesville, Okla., assignor to Phillips Petroleum Company, a corporation of Delaware Application August 10, 1953, Serial No. 373,211

8 Claims. (Cl. 324—10)

This invention relates to a method of and apparatus for determining the angle and direction of the dip of strata intersected by a drill hole. In another aspect it relates to a method of and apparatus for indicating brecciated zones intersected by a drill hole.

An important factor in geophysical prospecting is a knowledge of the angle and the direction of dip of strata under consideration. The determination of these quantities obviously is of considerable practical importance in the study of geological structures and in the selection of locations for the drilling of wells.

One procedure that has been employed heretofore to determine the dip of strata intersected by a drill hole has been to take a plurality of cores from the formations adjacent the drill hole. A study of these cores generally provides some information regarding the slope of the strata. However, such a procedure is both costly and time-consuming, and does not provide a continuous determination of the dip of strata intersected by the drill hole. Another system that has been used to determine dip makes use of an "anisotrophy dipmeter." The operation of this instrument is based on the fact that in sedimentary formations the electrical resistivity is lower in a direction parallel to the bedding planes than in a direction perpendicular thereto. Thus, by positioning a current input electrode at a first depth in a well and by positioning a pair of pickup electrodes at a second depth, any difference in potential between the two pickup electrodes indicates the presence of a dip in the adjacent strata. The direction of the dip can be obtained by rotating these pickup electrodes in the hole until a maximum potential difference is observed. While this system provides a crude measurement of dip, the accuracy generally leaves much to be desired. A third method of determining dip has involved measuring some electrical property of the surrounding formations on opposite sides of the well to detect dips by a difference in the measurements. For example, a plurality of electrodes spaced with regard to one another has been used to measure the spontaneous potential on opposite sides of the drill hole. However, this procedure is of no value in areas which contain long sections of non-porous, dense formations because the spontaneous potential variations in bore holes traversing such formations are very small. Still another procedure has been to log several adjacent wells and compare the depths of common beds. This procedure requires several wells and is of no value if discontinuities occur between the wells.

It is toward providing an accurate measurement of the dip of strata intersected by a single drill hole in terms of the electrical properties of the adjacent strata that the present invention is directed.

Accordingly, an object of this invention is to provide an improved method of and apparatus for measuring the electrical properties of formations adjacent a drill hole and on opposite sides thereof such that any dip of the formations can readily be determined.

A further object of this invention is to provide improved apparatus for making dip determinations in a continuous manner.

A still further object is to provide a method of detecting the presence of brecciated zones intersected by a drill hole.

The well logging apparatus of this invention comprises, generally, an elongated cylindrical guard electrode member constructed of electrically conductive material. This member is adapted to be lowered into a bore hole such that the axis of the member is generally coaxial with the axis of the bore hole. Suitable guide members can be provided to retain the member in this position and to prevent rotation of the member in the bore hole. A plurality of electrodes are positioned in spaced relation with one another in a plane substantially perpendicular to the axis of the member and near the midpoint thereof. These electrodes are mounted generally flush with the surface of the cylindrical member and electrically insulated therefrom. A source of electrical energy is conveniently positioned at the surface of the bore hole and has one terminal thereof grounded. The second terminal of this energy source is applied both to the cylindrical member and to each of the electrodes mounted therein. Current thus flows from the several electrodes through the surrounding earth formations and back to the grounded terminal of the electrical energy source. These current flows are measured individually. As long as the apparatus is positioned adjacent horizontal strata, like quantities of current flow from each of the electrodes at right angles to the axis of the well. However, when the electrode assembly is moved through strata which is not horizontal the individual electrodes are positioned adjacent different formations at a given time such that the individual current flows differ from one another. The dip of the formations adjacent the bore hole can be determined from these current flow measurements. Means also are provided in conjunction with the electrode assembly to measure both the direction and deviation of the bore hole from a vertical position, and these latter data can be correlated with the indicated dip to provide a true determination of both the amount and direction of the dip of intersected beds.

Various other objects, advantages and features of this invention should become apparent from the following detailed description taken in conjunction with the accompanying drawings in which.

Figure 1:
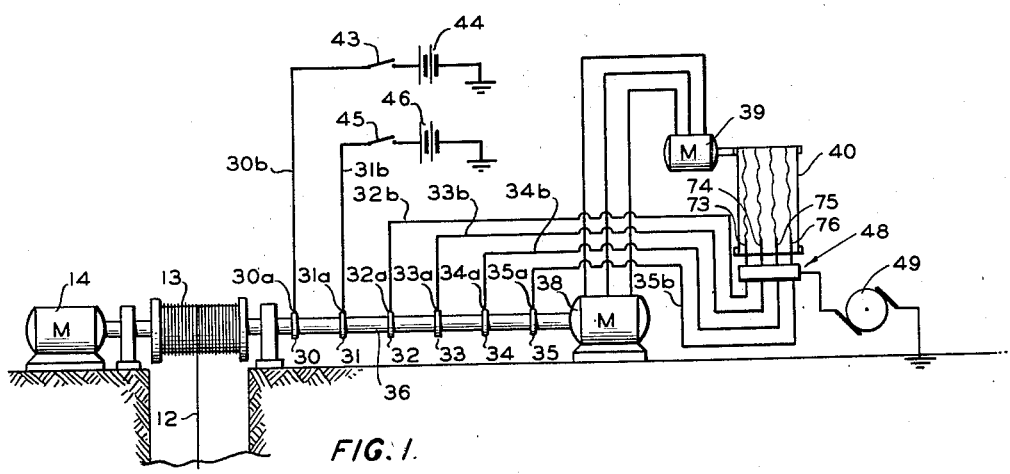
Figure 1 is a schematic representation of the well logging apparatus of this invention disposed in an operative position.

Referring now to the drawing in detail and to Figure 1 in particular, there is illustrated an electrical logging assembly 10 which is lowered into a bore hole 11 by means of a cable 12 which is suspended from a rotatable reel 13. Reel 13 is driven by a motor 14 such that assembly 10 can be raised or lowered to any desired depth in bore hole 11. Electrode assembly 10 includes an elongated generally cylindrical hollow shell 15 which is attached at its upper end to a support 16 and at its lower end to a support 17. The upper end of support 16 is in turn attached to cable 12 by a clamp 18. A plurality of flexible guide members 20 are attached to support 16 and extend outwardly therefrom to engage the wall of the bore hole. Similar flexible guide members 21 are attached to support 17. Guide members 20 and 21 thereby perform the dual functions of orienting the electrode assembly in the bore hole and generally preventing rotation of the assembly. Three small openings are provided in shell 15 near the center thereof vertically and electrodes 23, 24 and 25 are mounted in these holes by respective insulating supports 26, 27 and 28. Electrodes 23, 24 and 25 lie 120° apart in a horizontal plane when the assembly is positioned such that the longitudinal axis of cylindrical shell 15 is vertical.

Cable 12 contains a plurality of electrical leads that terminate at their upper ends in respective slip rings 30, 31, 32, 33, 34 and 35 which are mounted on the drive shaft 36 of reel 13. Brushes 30a, 31a, 32a, 33a, 34a and 35a engage respective slip rings 30, 31, 32, 33, 34 and 35. A synchro-generator 38 is mechanically connected to shaft 36 and electrically connected to a corresponding synchro-motor 39, the latter being mechanically coupled to a recording chart 40 such that the position of chart 40 is a direct function of the depth to which assembly 10 is lowered into the bore hole. If desired, chart 40 can be mechanically coupled to drive shaft 36 through suitable linkage. A first electrical lead 30b extends between brush 30a and one terminal of a switch 43. The second terminal of switch 43 is connected to the first terminal of a battery 44, the second terminal of battery 44 being grounded. A lead 31b is connected between brush 31a and the first terminal of a switch 45. The second terminal of switch 45 is connected to the first terminal of a battery 46, the second terminal of battery 46 being grounded. Leads 32b, 33b, 34b and 35b extend between respective brushes 32a, 33a, 34a and 35a and respective channels of a multi-channel recorder 48 which provides traces on chart 40. A voltage source 49 has one terminal thereof connected to recorder 48, the second terminal of source 49 being grounded. The electrical circuit connections of Figure 1 are described in greater detail hereinafter.

Figure 2:
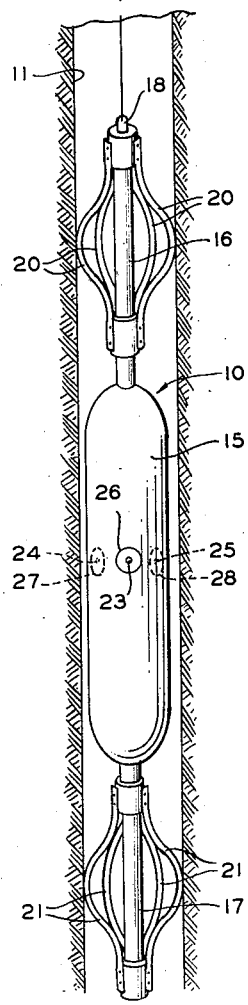
Figure 2 is a detailed view, shown partially in section, of the logging apparatus.

In Figure 2 there is shown a more detailed view of the electrode assembly. As therein illustrated, leads 32c and 33c are attached at their respective first ends to electrodes 23 and 24 and extend therefrom through cable 12 to respective slip rings 32 and 33. A hollow casing 50 of nonmagnetic material is positioned within the interior of cylindrical shell 15 to house suitable apparatus adapted to measure the direction and degree of deviation of cylindrical shell 15 from a vertical position. Mounted within the lower portion of housing 50 is a generally spherical member 51 which is constructed of a transparent material and which is partially filled with a fluid 52. A float 53 rests on the surface of fluid 52 to support a compass needle 54 in a horizontal position. Positioned above sphere 51 is a transparent cup member 56 which has an opaque ball 57 resting therein. A small pointer 58 is attached near the edge of member 56 and an apertured plate 59 is positioned above member 56. In the region above plate 59 there is mounted a reel 61 having a photographic film 62 wound thereon. Film 62 passes from reel 61 about a pair of supports 63 and 64 to a second reel 65 which is coupled to a motor 66. A lamp 68 is positioned adjacent member 56 to illuminate the region below plate 59. Lamp 68 is supplied with a first grounded lead 69 and with a second lead 30c which extends upwardly through cable 12 to slip ring 30. Closure of switch 43 thus supplies current to lamp 68 to illuminate the region below apertured plate 59 which in turn exposes film 62. Motor 66 is supplied with a first grounded lead 71 and with a second lead 31c which extends upward through cable 12 to slip ring 31. Closure of switch 45 thus supplies current to motor 66 which turns reel 65 to advance film 62.

Figure 3:
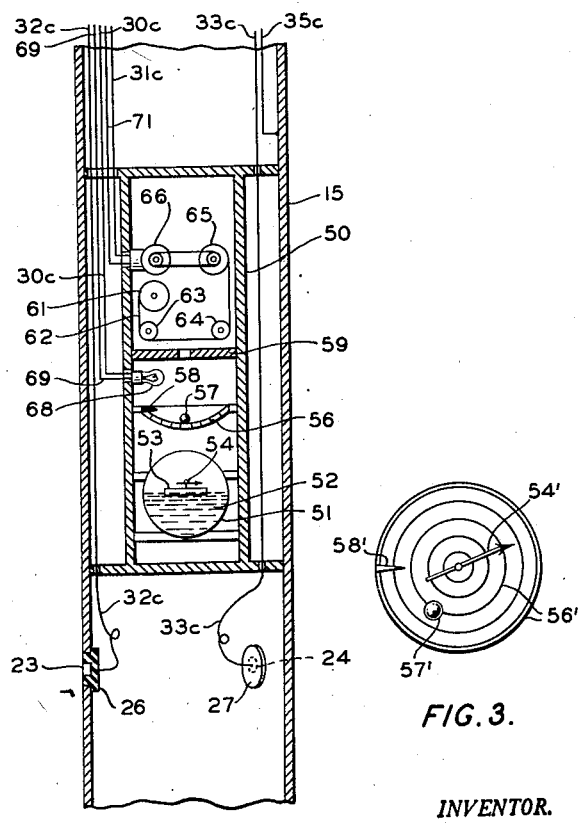
Figure 3 illustrates a record of the amount and direction of deviation of the bore hole from the vertical.

Whenever the region below apertured plate 59 is illuminated by lamp 68, film 62 is exposed as illustrated in Figure 3. An image 54' of compass needle 54 is formed with an image 57' superimposed thereon representative of the position of ball 57 in cup 56. Pointer 58 is reproduced as 58' to record the orientation of assembly 10 with respect to magnetic north as indicated by compass needle 54. Member 56 is provided with a plurality of opaque concentric rings which form images 56'. The image 57' of ball 57 thereby provides a determination of the deviation of assembly 10 from a vertical position. As long as assembly 10 remains vertical, ball 57 appears in the center ring of member 56; and the degree of deviation from this vertical position is represented by the particular ring in which ball 57 appears. Film 62 can be exposed continuously or periodically as necessary during the logging operation. A record of the exposure of film 62 as a function of depth of the assembly in the bore hole should be maintained. This can be recorded directly on chart 40 if desired.

The compass needle-rotating ball assembly thus far described should not be considered as a limitation of this invention because any of several systems known in the art for measuring the dip and orientation of bore holes can be used herein if desired. The illustrated arrangement is merely illustrative of one simple procedure of making such measurements.

Figure 4:
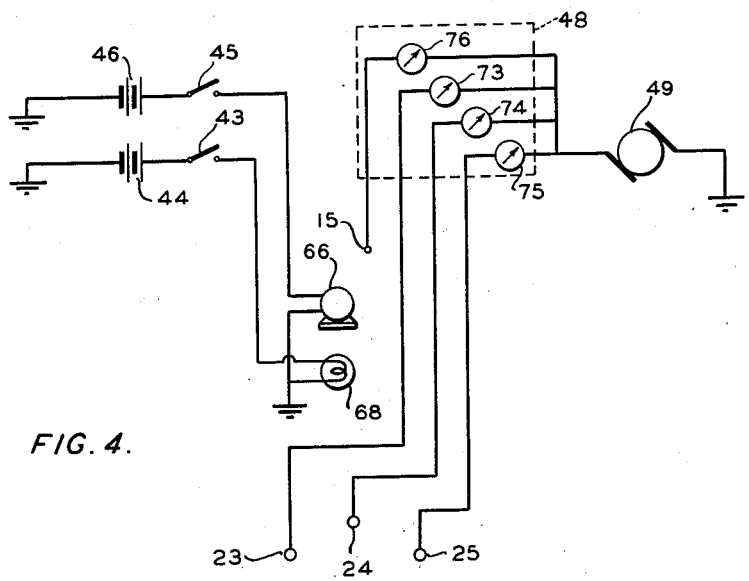
Figure 4 is a schematic circuit diagram of the electrical components associated with the electrode assembly.

A schematic representation of the electrical circuit associated with the well logging apparatus of this invention is shown in Figure 4. Electrodes 23, 24 and 25 are connected to the non-grounded terminal of voltage source 49 through respective current meters 73, 74 and 75, the connecting circuitry being illustrated in Figure 1. Shell 15 also is connected to the non-grounded terminal of voltage source 49 through a current meter 76. Meters 73, 74, 75 and 76 form separate channels of recorder 48 which can be any conventional current recording device. It should be apparent from an inspection of Figure 4 that electrodes 23, 24 and 25 and cylindrical shell 15 are maintained at substantially a constant common potential. The individual current flows outwardly from these several elements through the surrounding formations to ground are recorded by the respective current meters.

Figure 5:
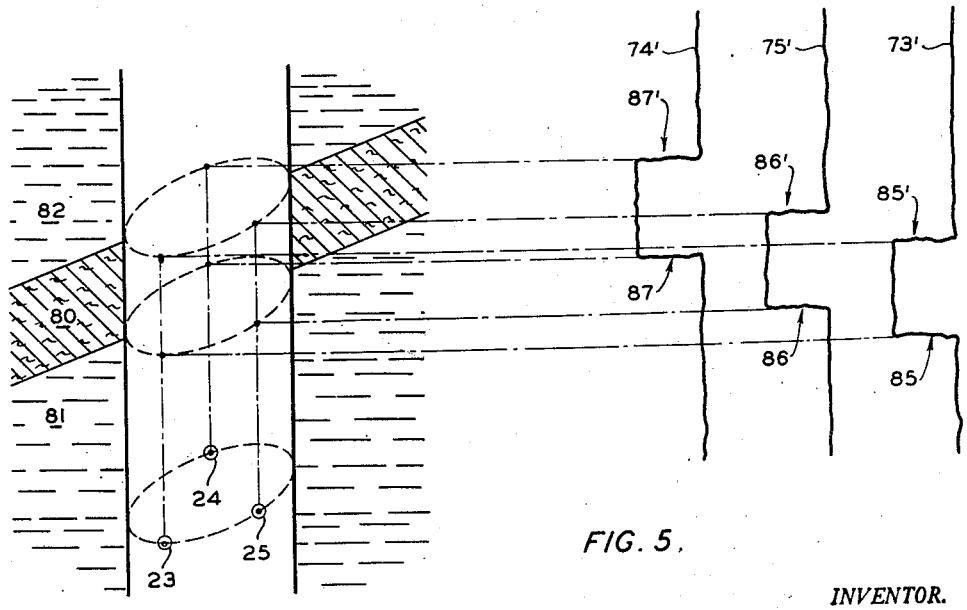
Figure 5 is a schematic representation of the principle of operation of the logging system of this invention.

The operation of the logging system of this invention to detect the dip of strata traversed by the bore hole can be explained in conjunction with Figure 5. Since cylindrical shell 15 and electrodes 23, 24 and 25 are maintained at a common potential, the cylindrical shell functions as a guard electrode whereby the current flow outwardly from electrodes 23, 24 and 25 is in substantially a horizontal path if shell 15 remains vertical. This current flow remains perpendicular to the axis of shell 15. As long as the electrode assembly is moved through a homogeneous medium the current flows from the several electrodes 23, 24 and 25 remain substantially equal. However, if the assembly approaches a bed which is at an angle other than perpendicular to the axis of the bore hole, such as illustrated by bed 80 in Figure 5, the measured current flows from the several electrodes vary as these individual electrodes move into and out of bed 80. If electrodes 23, 24 and 25 are moved upwardly toward bed 80, for example, electrode 23 moves into the region adjacent bed 80 before electrodes 24 and 25 move into this region. If the electrical properties of bed 80 differ from the electrical properties of the bed 81 beneath bed 80, the current flow outwardly from electrode 23 deviates from the current flow from electrodes 24 and 25. This is illustrated by the break 85 in the recorded curve 73' of meter 73. As the electrode assembly moves further upwardly, electrode 25 enters bed 80 and the current flow therefrom changes as indicated by the break 86 in the recorded curve 75' of meter 75. Still later, electrode 24 moves into bed 80 and a break 87 occurs in the recorded curve 74' of meter 74.

The distances between these breaks in the several curves can be correlated with the diameter of cylindrical shell 15 to provide an indication of the slope of the lower boundary of bed 80. It should be noted that the three points obtained by spacing electrodes 23, 24 and 25 120° apart are sufficient to determine the plane of the lower surface of bed 80. Corresponding breaks 85', 86' and 87' are obtained in the curves recorded by meters 73, 75 and 74 as the electrode assembly moves upwardly past the upper boundary of bed 80 into formation 82. By comparing these curves of meters 73, 74 and 75 with photographic film 62 it is possible to calculate by simple trigonometry both the true dip of the formations adjacent bore hole 11 and the orientation of such formations with respect to the earth's magnetic field. More than three electrodes can be used if desired, but three are sufficient to define a plane. While shell 15 has been described as completely enclosing electrodes 23, 24 and 25, such a configuration is not essential to satisfactory operation of this invention. Shell 15 should, however, be sufficiently large and closely spaced to the electrodes that the current flow outwardly from the electrodes is substantially radial from the vertical axis of the assembly. Whenever the assembly passes through a brecciated zone the readings of meters 73, 74 and 75 are likely to be completely at random with one another thereby providing an indication of such a zone. Meter 76 can be utilized in conjunction with meters 73, 74 and 75 to measure the total outward current flow from the electrode assembly. This in turn provides some indication of the resistivity of the formations surrounding the bore hole.

While this invention has been described in conjunction with a present preferred embodiment thereof it should be apparent that the invention is not limited thereto.

What is claimed is:

1. Well logging apparatus comprising, in combination, an elongated generally cylindrical member of electrically conductive material adapted to be suspended in a bore hole whereby the axis of said member is substantially coaxial with the axis of the bore hole, said member having a plurality of openings in the surface thereof, said openings being spaced from one another and lying in a common plane which is at a predetermined angle with the axis of said cylindrical member, said plane being spaced from both ends of said member, a plurality of electrodes, and means mounting said electrodes in respective ones of said openings so that said electrodes are electrically insulated from said member but in electrical contact with any fluid in the bore hole into which said member is suspended.

2. Well logging apparatus comprising, in combination, an elongated generally cylindrical member of electrically conductive material adapted to be suspended in a bore hole whereby the axis of said member is coaxial with the axis of the bore hole, said member having a plurality of openings in the surface thereof, said openings being spaced from one another and lying in a common plane which is perpendicular to the axis of said cylindrical member, said plane being spaced from both ends of said member, means attached to said cylindrical member to measure the inclination of said member from a vertical position and the orientation of said member with respect to the earth's magnetic field, a plurality of electrodes, and means mounting said electrodes in respective ones of said openings so that said electrodes are electrically insulated from said member but in electrical contact with any fluid in the bore hole into which said member is suspended.

3. Well logging apparatus comprising, in combination, an elongated generally cylindrical member of electrically conductive material adapted to be suspended in a bore hole whereby the axis of said member is coaxial with the axis of the bore hole, said member having a plurality of openings in the surface thereof, said openings being spaced from one another and lying in a common plane which is perpendicular to the axis of said cylindrical member, said plane being spaced from both ends of said member, a plurality of electrodes, means mounting said electrodes in respective ones of said openings so that said electrodes are electrically insulated from said member but in electrical contact with any fluid in the bore hole into which said member is suspended, a source of electrical potential, one terminal of said source being connected to each of said electrodes and to said member, the second terminal of said source being connected to a point of reference potential, and means to measure the current flows from each of said electrodes to said point of reference potential when said member is suspended in a bore hole.

4. The combination in accordance with claim 3 further comprising means to measure the current flow from said member to said point of reference potential when said member is suspended in a bore hole.

5. Well logging apparatus comprising, in combination, an elongated generally cylindrical member of electrically conductive material adapted to be suspended in a bore hole whereby the axis of said member is coaxial with the axis of the bore hole, said member having a plurality of openings in the surface thereof, said openings being spaced from one another and lying in a common plane which is perpendicular to the axis of said cylindrical member, means for suspending said cylindrical member in a bore hole to known depths, guide means attached to said member to engage the wall of the bore hole, means attached to said cylindrical member to measure the inclination of said member from a vertical position and the orientation of said member with respect to the earth's magnetic field, a plurality of electrodes, means mounting said electrodes in respective ones of said openings so that said electrodes are electrically insulated from said member but in electrical contact with any fluid in the bore hole into which said member is suspended, a source of electrical potential, one terminal of said source being connected to each of said electrodes and to said member, the second terminal of said source being connected to a point of reference potential, and means to measure the current flows from each of said electrodes to said point of reference potential when said member is suspended in a bore hole.

6. The combination in accordance with claim 5 wherein said means to measure the inclination and orientation of said member comprises a transparent body partially filled with a liquid, a float positioned on said liquid, a compass needle mounted on said float, a transparent cup member positioned above said transparent body, an opaque ball positioned in said cup member, first and second reels positioned above said cup member, a photographic film connected between said reels, a motor attached to one of said reels, means to energize said motor, an aperture positioned between said cup member and said film, a lamp positioned adjacent said cup member and said transparent body, and means to illuminate said lamp whereby said film is exposed to record an image of said needle having an image of said ball superimposed thereon.

7. Well logging apparatus comprising, in combination, an elongated cylindrical member of electrically conductive material adapted to be suspended in a bore hole whereby the axis of said member is coaxial with the axis of the bore hole, said member having three openings in the surface thereof, said openings being spaced 120° from one another in a plane perpendicular to the axis of said cylindrical member, said plane being spaced from both ends of said member, and three electrodes, and means mounting said electrodes in respective ones of said openings so that said electrodes are electrically insulated from said member but in electrical contact with any fluid in the bore hole into which said member is suspended.

8. Well logging apparatus comprising, in combination, an elongated cylindrical member of electrically conductive material adapted to be suspended in a bore hole whereby the axis of said member is coaxial with the axis of the bore hole, said member having three openings in the surface thereof, said openings being spaced 120° from one another in a plane perpendicular to the axis of said cylindrical member, said plane being spaced from both ends of said member, means for suspending said cylindrical member in a bore hole to known depths, three electrodes, and means mounting said electrodes in respective ones of said openings so that said electrodes are electrically insulated from said member but in electrical contact with any fluid in the bore hole into which said member is suspended, a source of electrical potential, one terminal of said source being connected to each of said electrodes and to said member, the second terminal of said source being connected to a point of reference potential, and means to measure the current flows from each of said electrodes to said point of reference potential when said member is suspended in a bore hole.

References Cited in the file of this patent

UNITED STATES PATENTS

| | | |
|---|---|---|
| 2,199,367 | Athy et al. | Apr. 30, 1940 |
| 2,242,612 | Leonardon | May 20, 1941 |
| 2,347,794 | Piety | May 2, 1944 |
| 2,400,678 | Archie | May 21, 1946 |
| 2,427,950 | Doll | Sept. 23, 1947 |
| 2,446,303 | Owen | Aug. 3, 1948 |
| 2,476,137 | Doll | July 12, 1949 |
| 2,592,125 | Doll | Apr. 8, 1952 |
| 2,633,485 | Patnode | Mar. 31, 1953 |
| 2,655,632 | Murphree | Oct. 13, 1953 |

FOREIGN PATENTS

| | | |
|---|---|---|
| 691,721 | Great Britain | May 20, 1953 |